United States Patent [19]

Taylor et al.

[11] Patent Number: 5,306,581
[45] Date of Patent: * Apr. 26, 1994

[54] BATTERY WITH WELDABLE FEEDTHROUGH

[75] Inventors: William J. Taylor, Anoka; Douglas J. Weiss, Plymouth; Joseph Lessar, Coon Rapids; Jennifer P. Miller, Elk River; Robert E. Kraska, Minneapolis, all of Minn.

[73] Assignee: Medtronic, Inc., Minneapolis, Minn.

[*] Notice: The portion of the term of this patent subsequent to Apr. 14, 2009 has been disclaimed.

[21] Appl. No.: 865,381

[22] Filed: Apr. 8, 1992

Related U.S. Application Data

[63] Continuation-in-part of Ser. No. 612,115, Nov. 9, 1990, Pat. No. 5,104,755, which is a continuation-in-part of Ser. No. 366,430, Jun. 15, 1989, abandoned.

[51] Int. Cl.⁵ .................................. H01M 2/30
[52] U.S. Cl. ......................... 429/181; 424/184
[58] Field of Search ............................ 429/181, 184

[56] References Cited

U.S. PATENT DOCUMENTS

| 4,053,692 | 10/1977 | Dey . | |
|---|---|---|---|
| 4,158,721 | 6/1979 | Decker et al. | 429/184 X |
| 4,168,351 | 9/1979 | Taylor | 429/181 X |
| 4,233,372 | 11/1980 | Bro et al. | 429/181 X |
| 4,556,613 | 12/1985 | Taylor . | |
| 4,587,144 | 5/1986 | Kellerman et al. | 429/181 X |
| 4,609,598 | 9/1986 | Tucholski et al. | 429/181 X |
| 4,792,503 | 12/1988 | Eppley | 429/181 |
| 4,833,049 | 5/1989 | Teaford et al. | 429/181 |
| 4,940,858 | 7/1990 | Taylor . | |
| 5,104,755 | 4/1992 | Taylor et al. | 429/181 |

Primary Examiner—Stephen Kalafut
Attorney, Agent, or Firm—Daniel W. Latham; Harold R. Patton

[57] ABSTRACT

A lithium battery having a weldable feedthrough which is compatible with liquid electrolytes containing organic solvents and lithium salts under long term use conditions. The feedthrough comprises a pin of niobium or tantalum and ductile alloys thereof and a low silica insulating glass positioned around a portion of the pin in sealing engagement with the pin. The feedthrough is assembled into an aperture of the battery case where it provides an electrically conductive pathway from the anode or cathode to the exterior of the case and provides a hermetic seal.

18 Claims, 2 Drawing Sheets

BATTERY WITH WELDABLE FEEDTHROUGH

This is a continuation-in-part of U.S. Ser. No. 07/612,115 Filed on Nov. 9, 1990 now U.S. Pat. No. 5,104,755 which is a continuation-in-part of U.S. Ser. No. 07/366,430 filed Jun. 15, 1989, now abandoned.

BACKGROUND OF THE INVENTION

This invention relates to hermetically sealed batteries having glass-to-metal seals and especially to lithium batteries with organic electrolytes containing lithium salts which are intended for long term use in implantable medical devices.

Low silica glasses such as Ta-23 glass were developed for glass-to-metal seals for hermetically sealed batteries with lithium-containing electrolyte compositions. They are highly resistant to lithium ion attack for long term battery applications (more than 2 years of reliable operation and typically 7-10 years of reliable operation) and are highly effective insulators. A feedthrough pin bonded to the center of the glass seal is typically molybdenum due to its resistance to the corrosive effects of lithium battery materials and due to its close match with the thermal expansion characteristics of the glass. However, molybdenum also has a serious disadvantage in that it is difficult to make reliable electrical connections by welding to the molybdenum pin. Molybdenum can react with atmospheric moisture to form an oxide layer which can inhibit effective welding. Molybdenum is also a material with low ductility which makes welding difficult. Other pin materials such as tantalum or niobium, which are known to be more easily welded, would therefore be desirable.

In U.S. Pat. No. 4,556,613 issued to Taylor et al., glass-metal seals for lithium batteries are disclosed with particular applications directed to sulfur dioxide and thionyl chloride cells. Although Taylor et al. does not disclose a glass with a low silica content (such as the silica content of Ta-23 glass) for the feedthrough, it does suggest that such metals as tantalum and niobium are stable with lithium. Similar suggestions are made in U.S. Pat. No. 4,233,372 issued to Bro et al. and in U.S. Pat. No. 4,168,351 issued to Taylor. However, not all of the materials set forth in those patents can be relied on to provide long term corrosion stability in battery feedthrough pin applications. Localized corrosion of metals in the form of crevice corrosion may occur when two metals or nonmetal-to-metal components are joined to form a crevice. These crevices can contain electrolyte which seeps into the interfaces, causing crevice corrosion in the form of pitting attack on certain materials. Feedthroughs prompt concern about corrosion due to the relatively small diameter of the feedthrough pin and the crevices formed between the sealing glass and the pin. Tantalum and other metals have, however, been taught to be suitable for use in feedthroughs outside of battery applications. For example, in U.S. Pat. No. 4,940,858 issued to Taylor et al., a feedthrough for an implantable pulse generator is disclosed in which a feedthrough pin of niobium or tantalum is said to be suitable for use in combination with a fusible glass composition such as Ta-23 glass. However, it is not disclosed that whether these combinations could be suitable to make a corrosion-resistant hermetic seal for lithium batteries.

SUMMARY OF THE INVENTION

We have discovered a lithium battery having a weldable feedthrough which is compatible with liquid electrolytes containing organic solvents and lithium salts under long term use conditions. The feedthrough comprises a pin of niobium or tantalum and ductile alloys thereof and a low silica or silica-free insulating glass positioned around a portion of the pin in sealing engagement with the pin. Preferably, the feedthrough also includes a ferrule that is positioned around a portion of the glass in sealing engagement with the glass. The feedthrough is assembled into an aperture of the battery case where it provides an electrically conductive pathway from the anode or cathode to the exterior of the case and provides a hermetic seal. The niobium or tantalum pin materials have been shown to have especially good resistance to corrosion when maintained at anodic battery potential. The pin material also possesses improved resistance to moisture, improved ductility and improved weldability when compared with molybdenum.

DETAILED DESCRIPTION OF THE INVENTION

Figure 1:
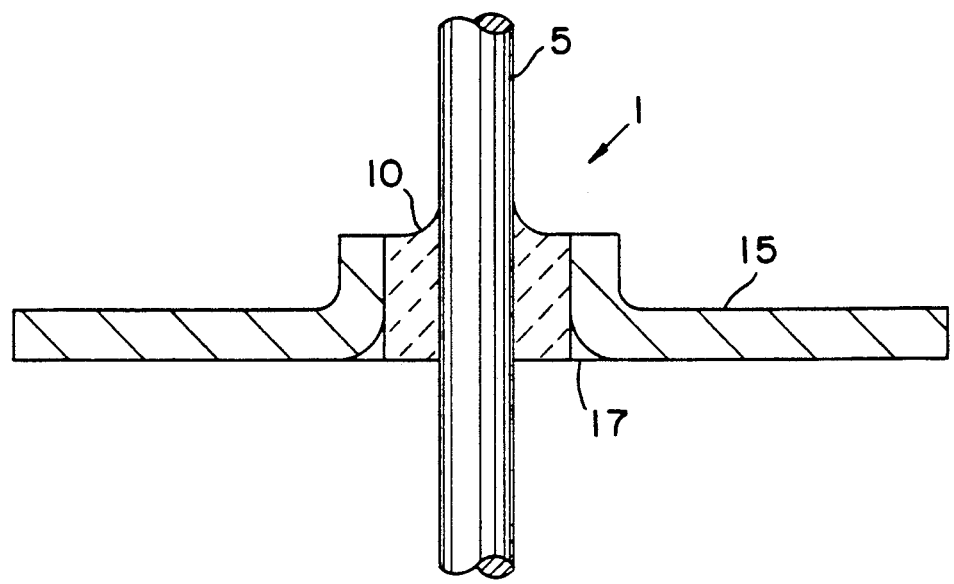
FIG. 1 is an elevational sectional view of a first feedthrough made according to the present invention.
Figure 2:
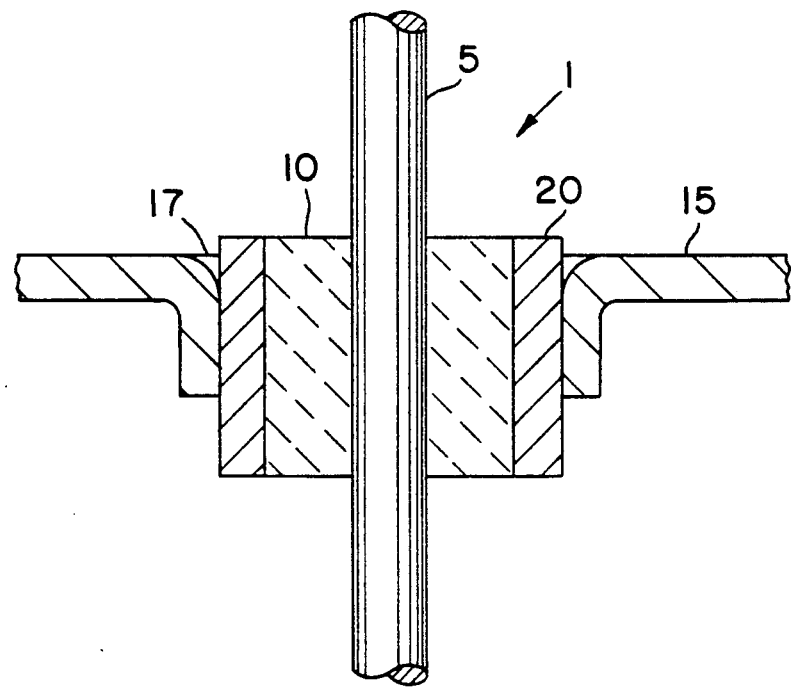
FIG. 2 is an elevational sectional view of a second feedthrough made according to the present invention.
Figure 3:
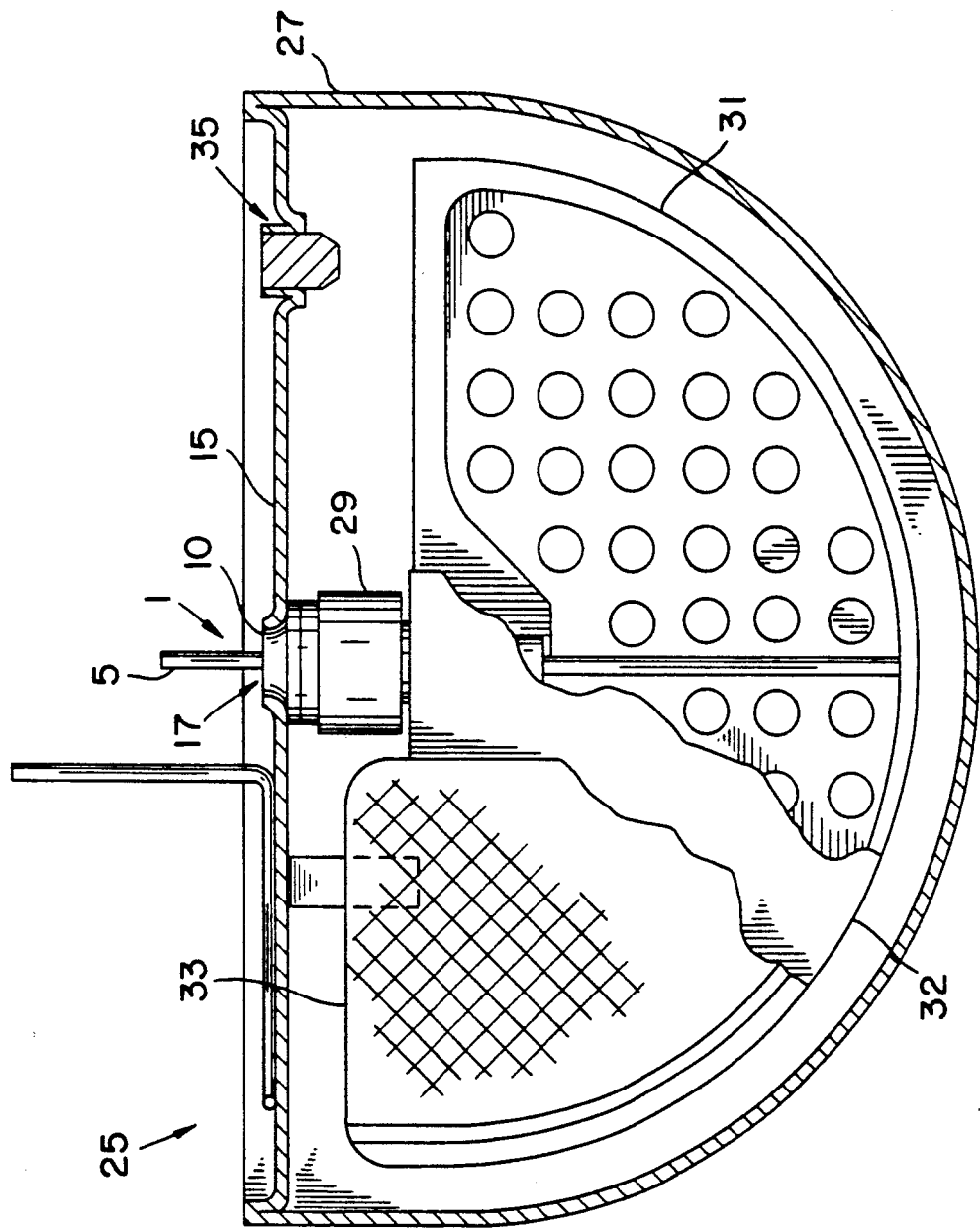
FIG. 3 is an elevational sectional view of a battery employing a feedthrough according to the present invention.

Referring to FIGS. 1-2, a typical feedthrough 1 is shown which includes a pin 5, a portion of which is in sealing engagement with an insulating glass 10 which extends around the pin 5 and also provides a sealing engagement with a header 15 at an aperture 17. Optionally, a ferrule 20 can be welded to the header 15 at the aperture 17 and sealed to the glass 10. Referring now also to FIG. 3, a battery 25 is shown having a case 27 with a header portion 15 having an aperture 17 into which a feedthrough 1 is secured. The pin 5 extends through the insulating glass 10, through insulator 29 and is electrically connected to a current collector 31 which is in electrical contact with a lithium anode 32. A cathode/cathode current collector 33 is electrically connected to the metal of the header 15. Also shown is a fill port 35 which may be hermetically sealed after addition of the electrolyte. It will be appreciated by those skilled in the art that many alternative feedthrough configurations and battery configurations can be used in the present invention in addition to the exemplary feedthrough and battery configurations of FIGS. 1-3.

In the present invention, the battery is a battery with a lithium anode and an electrolyte comprising a lithium salt in an organic solvent. The lithium salt can be, for example, LiClO$_4$, lithium trifluorosulfonate, LiPF$_6$, LiCF$_3$SO$_3$, LiBF$_4$, or LiAsF$_6$. The organic solvent can be, for example, propylene carbonate, glyme, diglyme, dioxolane, dimethyl sulfoxide, sulfolane, gamma-butyrolactone and various mixtures thereof.

The cathode material for the battery can be, for example, manganese dioxide, silver vanadium oxide (Ag$_2$V$_4$O$_{11}$), vanadium oxide (V$_6$O$_{13}$), carbon monofluoride (CF$_x$) and various mixtures thereof.

The anode, cathode and electrolyte components are enclosed in a case, the case preferably hermetically sealing the components to prevent discharge of harmful gases and liquids so that the battery may be suitable for use in applications where sealing is critical such as in implantable medical devices.

A feedthrough provides an insulated electrical connection from the case interior to the case exterior and preferably also maintains the hermetic seal of the case. The feedthrough includes a pin made from niobium, tantalum and ductile alloys of niobium or tantalum. The pin, may be used to make contact with either the cathode or anode components of the battery. For example, in a preferred embodiment of a battery with a silver vanadium oxide cathode, the feedthrough pin would be used to make contact with the cathode.

The feedthrough also includes a low silica or silica-free insulating glass of about 0–50% silica content positioned around a portion of the pin in sealing engagement with the pin. It will be understood by those skilled in the art that a low silica or silica-free glass is highly desirable for use in lithium batteries since, over time, lithium in contact with the glass tends to replace silica in the glass, thereby compromising the insulating properties of the glass. It will also be understood by those skilled in the art that the glass selected will have a coefficient of thermal expansion which is compatible with the pin material employed so as to provide a desired compressive or matched seal between the glass and the pin material and between the glass and battery case or between the glass and the ferrule. Suitable low silica or silica-free insulating glass can be, for example, Ta-23 glass, Cabal-12 glass, and the like. The nominal compositions of Ta-23 and Cabal-12 glasses are set forth in Table I. Ta-23 glass may also contain about 0.02 to 0.05% CoO to provide color enhancement but it is not required for feedthroughs according to the present invention.

TABLE I

| Constituent | Ta-23 Glass wt % | Cabal-12 Glass wt % |
|---|---|---|
| $SiO_2$ | 45 | |
| $B_2O_3$ | 8 | 43.8 |
| $Al_2O_3$ | 20 | 28.9 |
| MgO | 7 | 11.4 |
| CaO | 12 | 15.9 |
| SrO | 6 | |
| $La_2O_3$ | 2 | |

The feedthrough is both made and affixed in sealing engagement to the battery case by conventionally glassing the pin to an aperture in the case. The pin can be glassed directly into the case aperture or, more preferably, glassed into a ferrule which has been welded to a case aperture. Ferrule materials for use in the present invention include MP-35N, 316L stainless steel and 304L stainless steel.

EXAMPLE 1

Lithium/$MnO_2$ cells were made with a 50/50 mixture of propylene carbonate and diglyme with 1M $LiAsF_6$ as an electrolyte. Feedthroughs at anode potential included either molybdenum or niobium in sealing engagement with cobalt-free Ta-23 glass and a ferrule of MP-35N material around the insulating glass. Cells were discharged for one year. Some cells were discharged at 37° C. while others were discharged at 60° C. as an accelerated corrosion test. No macroscopic signs of localized corrosive attack were evident on any of the pins.

EXAMPLE 2

The corrosion behavior of molybdenum, niobium and tantalum were tested at 37° C. and 60° C. in an electrolyte solution of 1M $LiClO_4$ in a 50/50 mixture of propylene carbonate and glyme. Anodic polarization and galvanic coupling to silver vanadium oxide were utilized to assess the suitability of the metals for use as feedthrough pins. Anodic polarization data obtained at elapsed times of approximately 2 weeks and 52 weeks indicated that each metal tested is immune to pitting corrosion. Ongoing corrosion of the materials indicated that the corrosion rate for tantalum and niobium declines slightly with increased exposure time while that of molybdenum exhibits little change. In the galvanic couple testing, the results for the worst case corrosion rates are as set forth in Table II.

TABLE II

| Material | Corrosion at 37° C. micro-in/yr | Corrosion at 60° C. micro-in/yr |
|---|---|---|
| molybdenum | 11 | 35 |
| niobium | 0.2 | 2.6 |
| tantalum | 0.16 | 0.4 |

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. A battery with a weldable feedthrough, the battery comprising:
   (a) a case defining a feedthrough aperture;
   (b) a lithium anode;
   (c) a cathode;
   (d) an electrolyte comprising a lithium salt in an organic solvent within the case; and
   (e) a feedthrough secured in the aperture comprising:
      1. a pin of a metal selected from the group consisting of niobium and ductile alloys thereof; and
      2. an insulating glass positioned around a portion of the pin in sealing engagement with the pin, said insulating glass having a silica content of 0–50%.

2. The battery of claim 1 wherein the pin is in electrical contact with the anode.

3. The battery of claim 1 wherein the pin is in electrical contact with the cathode.

4. The battery of claim 1, 2 or 3 wherein the sealing engagement provides a hermetic seal.

5. The battery of claim 4 wherein the insulating glass is selected from the group consisting of Ta-23 glass and Cabal-12 glass.

6. The battery of claim 4 wherein the lithium salt is selected from the group consisting of $LiClO_4$, lithium trifluorosulfonate, $LiPF_6$, $LiCF_3SO_3$, $LiBF_4$, and $LiAsF_6$.

7. The battery of claim 4 wherein the organic solvent is selected from the group consisting of propylene carbonate, glyme, diglyme, dioxolane, dimethyl sulfoxide, sulfolane, gamma-butyrolactone and mixtures thereof.

8. The battery of claim 4 also comprising a ferrule positioned around a portion of the glass in sealing engagement with the glass and welded into the feedthrough aperture.

9. The battery of claim 8 wherein the ferrule material is selected from the group consisting of MP-35N, 316L stainless steel and 304L stainless steel.

10. The battery of claim 1 or 3 wherein the cathode material is selected from $MnO_2$, $Ag_2V_4O_{11}$, $V_6O_{13}$, $CF_x$ and mixtures thereof.

11. A battery with a weldable feedthrough, the battery comprising:
(a) a case defining a feedthrough aperture;
(b) a lithium anode;
(c) a cathode comprised of a material selected from the group consisting of manganese dioxide and silver vanadium oxide;
(d) an electrolyte comprising a lithium salt in an organic solvent within the case; and
(e) a feedthrough hermetically secured in the aperture comprising:
(1) a pin in contact with the anode, the pin comprised of a metal selected from the group consisting of niobium, tantalum and ductile alloys thereof; and
(2) an insulating glass positioned around a portion of the pin in sealing engagement with the pin, the insulating glass having a nominal composition of $SiO_2 = 45$ wt %, $B_2O_3 = 8$ wt %, $Al_2O_3 = 20$ wt %, $MgO = 7$ wt %, $CaO = 12$ wt %, $SrO = 6$ wt %, and $La_2O_3 = 2$ wt %.

12. The battery of claim 11 wherein the lithium salt is selected from the group consisting of $LiClO_4$, lithium trifluoroacetate, $LiPF_6$, $LiCF_3SO_3$, $LiBF_4$, and $LiAsF_6$.

13. The battery of claim 11 wherein the organic solvent is selected from the group consisting of propylene carbonate, glyme, diglyme, dioxolane, dimethyl sulfoxide, sulfolane, gamma-butyrolactone and mixtures thereof.

14. The battery of claim 11 also comprising a ferrule made from MP-35N positioned around a portion of the glass in sealing engagement with the glass and welded into the feedthrough aperture.

15. A battery with a weldable feedthrough, the battery comprising:
(a) a case defining a feedthrough aperture;
(b) a lithium anode;
(c) a cathode comprised of a material selected from the group consisting of manganese dioxide and silver vanadium oxide;
(d) an electrolyte comprising a lithium salt in an organic solvent within the case; and
(e) a feedthrough hermetically secured in the aperture comprising:
(1) a pin in contact with the anode, the pin comprised of a metal selected from the group consisting of niodium, tantalum and ductile alloys thereof; and
(2) an insulating glass positioned around a portion of the pin in sealing engagement with the pin, the insulating glass having a nominal composition of $B_2O_3 = 40$ wt %, $Al_2O_3 = 20$ wt %, $MgO = 20$ wt %, and $CaO = 20$ wt %.

16. The battery of claim 15 wherein the lithium salt is selected from the group consisting of $LiClO_4$, lithium trifluoroacetate, $LiPF_6$, $LiCF_3SO_3$, $LiBF_4$, and $LiAsF_6$.

17. The battery of claim 15 wherein the organic solvent is selected from the group consisting of propylene carbonate, glyme, diglyme, dioxolane, dimethyl sulfoxide, sulfolane, gamma-butyrolactone and mixtures thereof.

18. The battery of claim 15 also comprising a ferrule made from MP-35N positioned around a portion of the glass in sealing engagement with the glass and welded into the feedthrough aperture.

* * * * *